June 29, 1965 A. QUINCHE ETAL 3,191,223
APPARATUS FOR CLOSING THE OPEN END OF A CONTAINER
OF THERMOPLASTIC MATERIAL
Original Filed Sept. 13, 1954 3 Sheets-Sheet 1
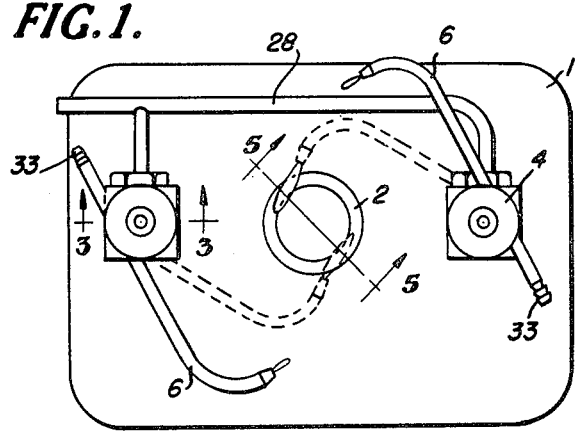
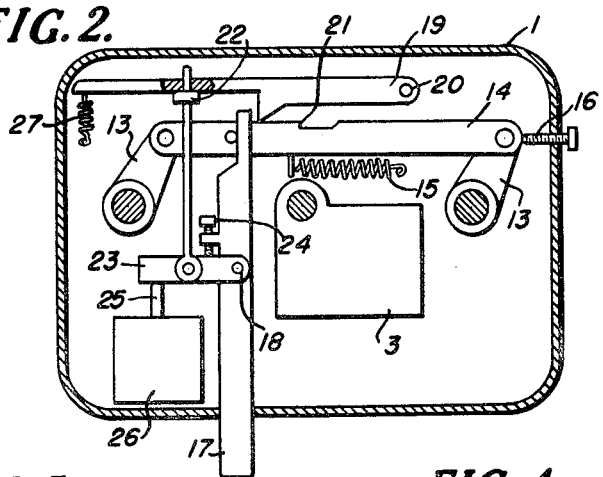
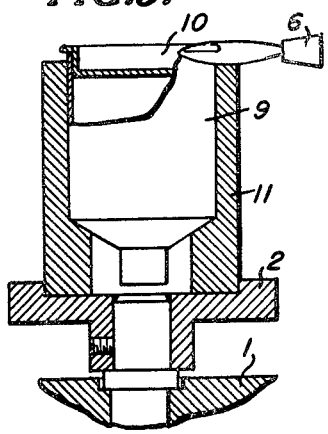
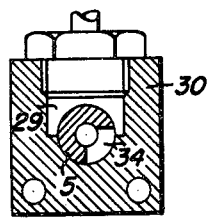
INVENTORS
ALBERT QUINCHE
EDOUARD LECLUYSE
BY Bertram F. Claeboe
George W. Reiber
ATTORNEY June 29, 1965 A. QUINCHE ETAL 3,191,223
APPARATUS FOR CLOSING THE OPEN END OF A CONTAINER
OF THERMOPLASTIC MATERIAL
Original Filed Sept. 13, 1954 3 Sheets-Sheet 2

INVENTORS
ALBERT QUINCHE
EDOUARD LE CLUYSE
BY Bertram F. Claebee
George W. Reifer
ATTORNEYS

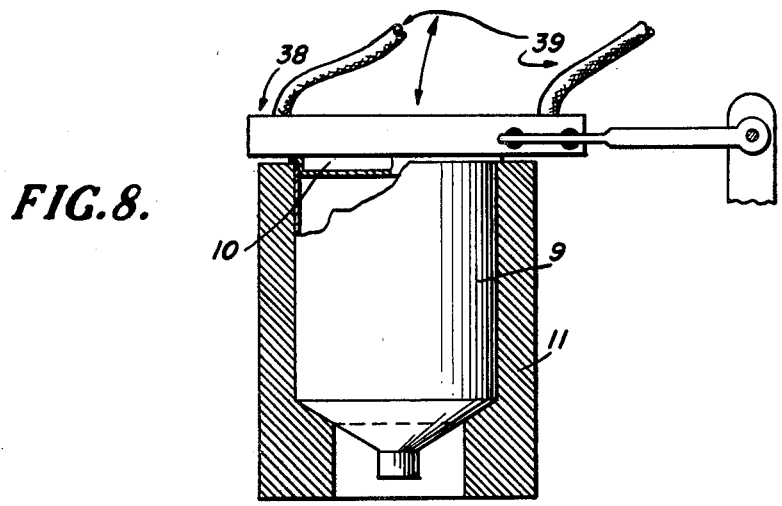
FIG.8.
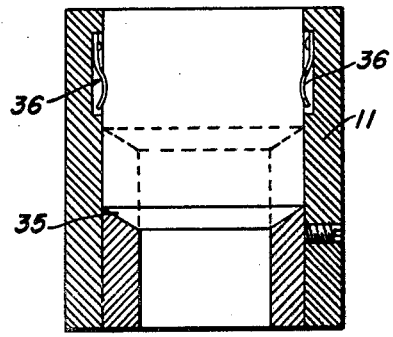
FIG.9.
FIG.10.
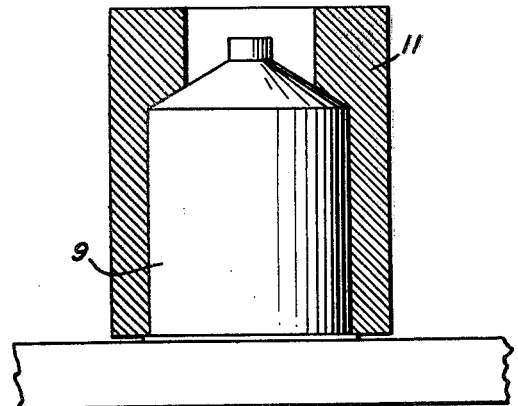
INVENTORS
ALBERT QUINCHE
EDOUARD LECLUYSE
BY Bertram H. Claeboe
George W. Reiber
ATTORNEYS United States Patent Office 3,191,223
Patented June 29, 1965

3,191,223
APPARATUS FOR CLOSING THE OPEN END OF A CONTAINER OF THERMOPLASTIC MATERIAL
Albert Quinche, St.-Sulpice, and Edouard Lecluyse, Vevey, Switzerland, assignors, by mesne assignments, to American Can Company, New York, N.Y., a corporation of New Jersey
Original application Sept. 13, 1954, Ser. No. 455,654, now Patent No. 3,052,926, dated Sept. 11, 1962. Divided and this application May 2, 1962, Ser. No. 193,062
5 Claims. (Cl. 18—1)

This is a divisional application of our application Serial No. 455,654, filed September 13, 1954, which matured into United States Patent No. 3,052,926.

This invention relates to an apparatus for sealing the open end of a container of flexible thermoplastic material, the apparatus comprising means for applying a closure to said end of said container, means for fusing the material at the adjacent surfaces of said container and end closure to form a substantially molten bead, and means for thereafter subjecting said bead to a cold pressure.

One form of apparatus includes a support to hold the container and closure and a heating device. Rotating means are provided to turn the support and secure a regular and progressive heating on all the adjacent surfaces of said container and end closure. In addition, cold pressure producing means are supplied to flatten the molten bead produced at the adjacent surfaces of said container and end closure.

Heretofore, attempts to permanently affix a plastic end closure to the open end of a thermoplastic container have been unsuccessful. The joint formed was only of a temporary nature and would become defective after rather limited use.

The apparatus utilized in the past to carry out such an operation effected heating and fusing alone with no accompanying cold pressure application on the molten bead. To eliminate resulting adverse effects, we have developed apparatus previously set forth including means for subjecting to cold pressure the molten bead formed at the adjacent surfaces of the container and the end closure. The advantages afforded by the seal produced include the fact that joint of a permanent nature is realized. Thus, the resulting container remains completely effective even after prolonged and rugged use.

With the above in mind, the principal object of this invention is to provide apparatus for sealing the open end of a container of flexible thermoplastic material, said apparatus comprising means for applying a closure to said end of said container, means for fusing the material at the adjacent surfaces of said container and end closure to form a substantially molten bead, and means for thereafter subjecting said bead to a cold pressure.

Another object of this invention is to provide a plastic container with a smooth exterior having a plastic closure fused on the open end thereof, said closure being cup-shaped and having a peripheral lateral flange, the cup being disposed within the confines of the container, and the flange being permanently united to the free edge of the open end of the container externally thereof.

Another and further object of this invention is to provide apparatus for sealing the open end of a container of flexible thermoplastic material, said apparatus comprising a support to hold a container and end closure, a heating device, rotating means adapted to turn the support and secure a regular and a progressive heating all over the adjacent surfaces of said container and end closure, and cold pressure producing means to flatten the molten bead produced at the adjacent surfaces of said container and end closure.

Still further objects and the entire scope of applicability of the present invention will become apparent from the detailed description given hereinafter. It should be understood, however, that the detailed description, while indicating preferred embodiments of the invention, is given by way of illustration only, since various changes and modifications within the spirit and scope of the invention will become apparent to those skilled in the art from this detailed description.

FIGURE 1 is a top plan view of one form of the apparatus.

FIGURE 2 is a sectional plan view of the apparatus partially in section illustrating the means for rotating the illustrated burners.

FIGURE 4 is an enlarged section taken on the line 4—4 of FIGURE 3.

FIGURE 5 is an enlarged sectional view taken on the line 5—5 of FIGURE 1.

FIGURE 8 is a side elevation view illustrating one means of applying cold pressure to the molten bead.

FIGURE 9 is a side elevation view illustrating means for varying the depth of the support member and for securing the container in the support.

FIGURE 10 is a side elevation view illustrating a modified means for applying cold pressure to the molten bead.

Figure 3:
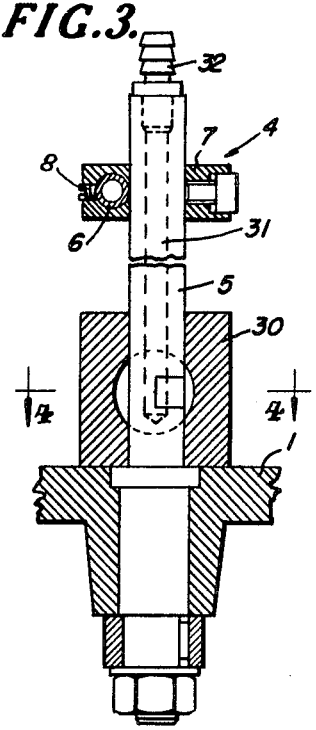
FIGURE 3 is an enlarged sectional view taken on the line 3—3 of FIGURE 1.

Our novel apparatus is designed to bring about the formation of a permanent seal between the open end of a container of flexible thermoplastic material and a closure therefor. A tubular plastic container is inserted in a support member conforming with the shape of the container and having means to securely fix said container in said support member. A cup-shaped plastic closure having a peripheral lateral flange thereon is then inserted within the confines of the container, the flange resting on the free edge of the container externally thereof. Thereafter, the support member including the container and closure assembly is rotated while being subjected to heat applied to the adjacent surfaces of said container and end closure. A molten bead is formed and said bead is thereafter subjected to cold pressure. The result is a container having an end closure thereon securely and permanently attached thereto.

The significant aspect of the invention involves utilization of cold pressure upon the molten bead. However, other features such as the design of the end closure are important. For example, the thickness and width of the peripheral lateral flange of the closure determines the amount of plastic activation that will result within a specified heating time. A portion of the adjacent container wall must become activated during the same heating time.

Further, in the design of the closure, it is important to provide for a tight fit between the closure and the container wall in order to insure pressure at the joint during heating and sealing. With this in mind, the support member should have an inner diameter of proper dimension in order to exert the pressure between the container end wall and the closure member.

Another feature that should be noted is the fact that the location of the thermoplastic container relative to the upper end of the support member is important in order that the proper amount of container end wall will be exposed to heat. This will help to determine the appearance as well as the effectiveness, to a certain extent, of the resulting joint.

The application of heat for activation should be uniform around the periphery of the sealing area. As noted heretofore, a preferred practice is to rotate the support assembly relative to the source of heat. Various heating means may be utilized but radiant heating appears to be the best as a practical matter.

Throughout this specification, we have stressed the importance of the novel cold pressure procedure. The exact physical effect that such cold pressure step has on the resulting seal is not completely ascertainable but one explanation may be as follows.

When the plastic closure is heated, the surface tension of the plastic material causes the formation of a bead. After sufficient heating time, the bead is drawn inwardly to rest on the edge of the container end wall. Additional heat will cause the bead to move inwardly from the outside periphery of the container end wall. When cold pressure is applied to a relatively cool flat member acting axially of the container and closure, the major portion of the molten material in the bead is pushed down inside the closure cavity to form a permanent union between the container and the closure.

An example that is illustrative of our novel apparatus for sealing the end of a container embodies the structure illustrated by the drawings. Referring to FIGURE 5, we see illustrated the support member 11 having positioned therein the container 9 and the closure 10. The support member includes the adjustable collar 35 (FIGURE 9) for adjustment of the depth of the support member to handle containers of different lengths. In addition, note the spring members 36 mounted in the openings in the support member wall for the purpose of gripping the container to hold the latter in a fixed position.

After the closure and container are positioned as illustrated in FIGURE 5, a heating means such as burners 6 or a radiant heating ring (not illustrated) are brought into proximity to the adjacent surfaces of the container and end closure. This is well illustrated in FIGURES 1 and 5.

Figure 7:
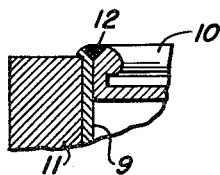

While heat is being applied, the support member assembly is being rotated in order to form a uniform substantially molten bead 12 shown in FIGURE 7. The characteristics of this bead are substantially as described heretofore.

Figure 11:
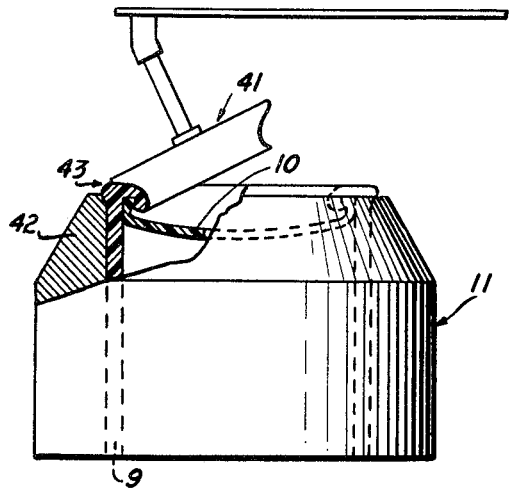
FIGURE 11 is a side elevation view illustrating a further modified means for applying cold pressure to the molten bead.

Upon the formation of the bead, the heating means is withdrawn and cold pressure is applied. This cold pressure can be supplied by various means as illustrated in FIGURES 8, 10 and 11. FIGURE 8 illustrates a preferred pressure producing means comprising a cold patter element 38. This patter is cooled by water running through tubes 39. The patter is placed above the container and closure assembly and can either be manually or automatically pressed thereon. The cold pressure imposed by this patter results in a container of permanent and durable character.

An alternative means for supplying this cold pressure is illustrated in FIGURE 10. A simple expedient is utilized in that, upon the formation of the substantially molten bead 12, the support member assembly is merely removed from revolving disc 2, inverted, and placed on a smooth cold metal plate 40. This results in cold pressure being applied to the molten bead due to the combined effect of the metal plate and the weight of the support member 11.

A further means for supplying the necessary pressure to the molten bead is well illustrated in FIGURE 11. Illustrated therein is the use of a rotatable roller member 41 to progressively apply pressure to the moten bead in a substantially radial direction. The bead is pressed between the roller member and the wall of the tubular support member 42 adjacent said bead. It should be noted that the illustrated roller member has a concave surface 43 operating to shape the molten bead to a specific form.

The machine represented in FIGURES 1 to 5 includes a frame 1, having a disc 2 mounted thereon. This disc 2 is rotated by means of electric motor 3 mounted in the frame. Burner holders 4 are placed on each side of the frame. Each of these burner holders (one of which is illustrated in detail in FIGURE 3) includes a vertical spindle 5 whose base swivels in frame 1 and holds a burner 6 mounted in support collar 7, said support collar fixing the burner by clamping screw 8.

Figure 6:
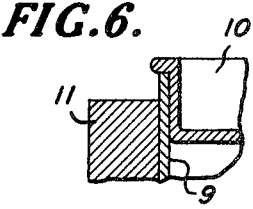
FIGURES 6 and 7 represent enlarged fragmentary views of a container provided with its bottom, before and after the welding of the latter.

The disc 2 is rotatable continuously by motor 3, as noted heretofore. Referring to FIGURE 5, we note support member 11 mounted on disc 2 and provided with container 9 and closure member 10. Also illustrated is the heating action of burner 6 which results in formation of the substantially molten bead 12 illustrated in FIGURE 7. FIGURE 6 shows the adjacent surfaces of the container and end closure prior to heating.

In order to insure the heating of the container and closure, only for the time necessary to obtain the desired molten bead, the apparatus includes a control assembly mounted in frame 1 and operating in such a way that burners 6, previously brought, by the rotation of spindles 5, into a heating position represented by dotted lines in FIGURE 1, will automatically resume, after a specified time, their withdrawn position represented by solid lines in FIGURE 1.

The two spindles 5 each has a small rod 13 connected with one another by coupling element 14, which insures their simultaneous rotation. A spring 15 urges element 14 against a stop screw 16 in the position illustrated in FIGURE 2 and corresponding to the rear position of burners 6.

Basically, the following steps occur. Actuation of control lever 17, swivelled in element 18 secured to the frame, shifts element 14 towards the left from the position shown to thereby turn the spindle 5 and thus bring burners 6 to their heating position. A latch 19 pivoting around point 20 engages notch 21 to thereby hold the element 14 in its new position against the action of spring 15 for a specified time. Before this notch 21 can operate in this way, a stop 22 is first removed due to the action of control lever 17 actuating lever 23 during its pivotal movement. The driving of lever 23 occurs through stop screw 24 only at the end of the pivoting of control lever 17.

The pivoting of lever 23 about element 18, besides moving stop 22, causes the displacement of a pusher 25 of a time-adjustable electric releaser 26, thus beginning the time cycle.

After the adjustment time of the releaser has passed, the pusher 25 resumes its initial position illustrated in FIGURE 2 and pushes back lever 23 and stop 22. The latter element in its turn pushes back the latch 19 against the action of spring 27. This movement releases element 14 which resumes its initial position under the action of spring 15 and returns the burners 6 to their rear position and the control lever 17 to its initial position.

The operator of the apparatus then replaces support member 11 with another support member in which is placed a container and closure to be joined. He then sets in motion control lever 17 to bring forward the burners and simultaneously switch on the automatic releaser 26 which will cause the withdrawal of the burners after a specified time as noted above.

In order to reduce the gas consumption in the illustrated apparatus, the burner holders 4 are provided with valves automatically securing the low burning of burners 6 when the latter are in the rear position. This feature is hereinafter described, and is illustrated in FIGURES 3 and 4.

To reach the burners, gas goes through a cylindrical groove 29 bored in block 30 which is screwed to frame 1. This groove 29 is crossed by spindles 5 and provided with an axial duct 31. Associated with duct 31 are couplings 32 and 33 which go to the gas supply (not shown). The spindle 5 has a radial aperture 34 to provide a passage for gas between groove 29 and duct 31. The opening of this aperture 34 extends over a quarter of the periphery of spindle 5 in such a way that the opening left for entry of gas is very much reduced when the burner is in its rear position and conversely increases, when the burner is brought in front position after the rotation of spindle 5.

It should be noted that burners 6 are adjustable in height by moving collar 7 along spindle 5. The burners are also radially adjustable by rotating the burner in said collar 7. Thus, the apparatus may easily be adapted for application to containers of various dimensions.

As noted heretofore, the apparatus illustrated in the drawings is only one means of carrying out our invention. For example, a radiant heating ring, not shown, can be easily substituted for the burners.

Our invention is applicable to thermoplastic containers in general. However, we find it particularly suitable in the sealing of containers of polyethylene or polyvinyl chloride.

We claim:

1. Apparatus for sealing a thermoplastic end closure to a thermoplastic container, comprising a support for holding a container, heating means for applying heat to an end of said container to fuse an end closure therewith, said support and said heating means being movable relative to each other, means for effecting a relative motion between said support and said heating means to bring said heating means and the end of the container into an operative position in close proximity to each other, releasable means for maintaining said heating means and the end of said container in said operative position, a timing device operable in response to the movement of said heating means and the end of said container into said operative position, means operable after a predetermined period of operation of said timing device for releasing, said releasable means, and means responsive to the release of said releasable means for effecting a relative motion between said heating means and said support to bring said heating means and the end of said container into an inoperative position remote from each other.

2. Apparatus as defined in claim 1 wherein said support includes a tubular member having an adjustable collar mounted therein for varying the inner dimensions of said tubular member for receiving containers of varying sizes and spring members carried by said tubular member for holding said containers firmly in said tubular member.

3. Apparatus as defined in claim 1 including cold pressure producing means for applying pressure to the joint between said end of said container and said end closure, said cold pressure producing means comprising a rotatable roller member having a concave surface thereon and capable of progressively pressing and shaping said joint.

4. Apparatus comprising a frame, an article support carried by said frame, heating means mounted on said frame for movement toward and away from said support, a spring biasing said heating means into an inoperative position remote from said support, a lever having a lost motion connection with said heating means for moving the latter into an operative position adjacent said support, a latch operatively associated with said heating means to hold the latter in its operative position, a timing device, an element movable in response to movement of said heating means into its operative position for actuating said timing device, and a lost motion connection between said timing device and said latch for moving the latter after a predetermined period of operation of said timing device to release said heating means from its operative position and permit said spring to return the same to its inoperative position.

5. Apparatus as defined in claim 4 wherein said heating means comprises a vertical spindle mounted on said frame for pivotal movement about its longitudinal axis, a gas burner carried by said spindle, a gas passage in said spindle having an outlet communicating with said burner and a transversely extending inlet for communication with a source of gas, and a stationary block carried by said frame adjacent said inlet operable to change the size of said inlet during the movement of said spindle.

References Cited by the Examiner
UNITED STATES PATENTS

| | | | |
|---|---|---|---|
| 1,040,410 | 10/12 | Rauch | 263—5 |
| 1,719,331 | 7/29 | Kemp | 263—5 |
| 2,050,088 | 8/36 | Dichter | 65—271 |
| 2,331,014 | 10/43 | Brown | 158—99 |
| 2,626,647 | 1/53 | Barton | 150—0.5 |
| 2,642,911 | 6/53 | De Shazor | 150—0.5 |
| 2,781,832 | 2/57 | O'Connor | 158—99 |
| 2,914,800 | 12/59 | Morin | 18—5 |
| 2,958,898 | 11/60 | Voumard et al. | 18—5 |

WILLIAM J. STEPHENSON, *Primary Examiner.*